Figures 1, 2:
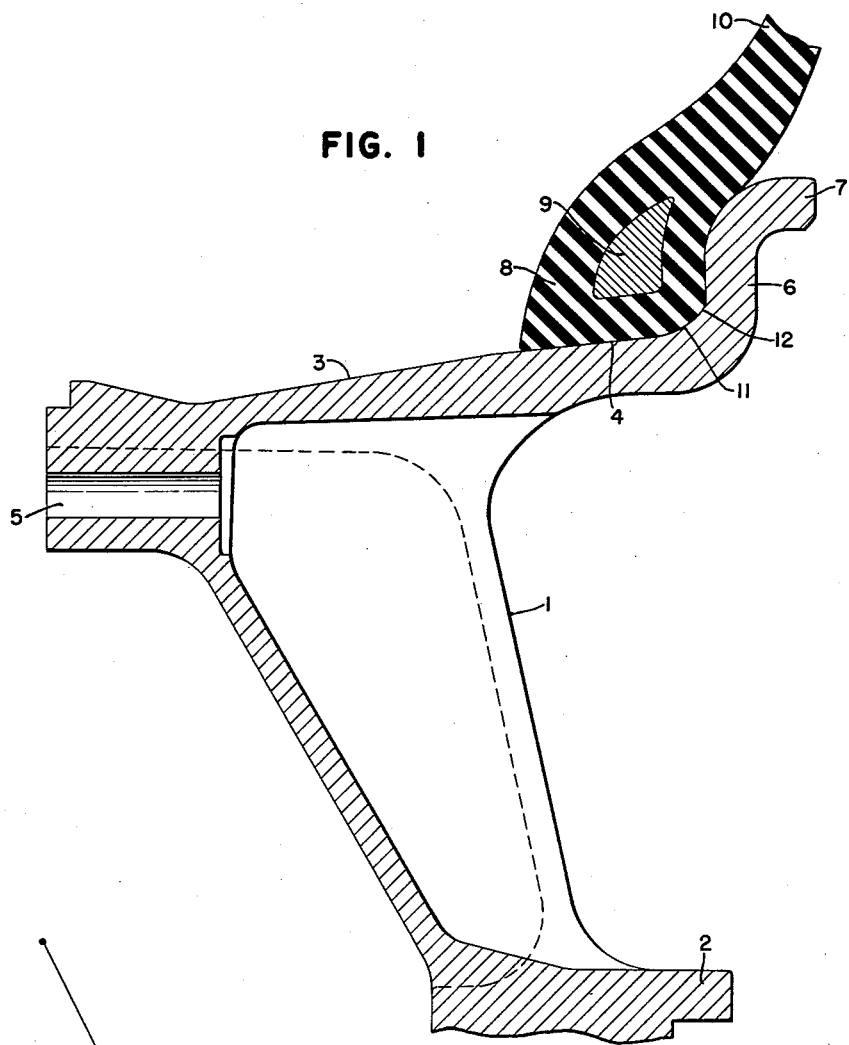

Oct. 15, 1963     H. N. YAZELL, JR     3,107,125
COMPOUND HEEL RADIUS FOR BEAD SEATS OF PNEUMATIC TIRE WHEELS
Filed Oct. 4, 1962

INVENTOR.
HAROLD N. YAZELL, JR.
BY
*J.B. Holden*
ATTORNEY

United States Patent Office 3,107,125
Patented Oct. 15, 1963

3,107,125
COMPOUND HEEL RADIUS FOR BEAD SEATS OF PNEUMATIC TIRE WHEELS
Harold N. Yazell, Jr., Cuyahoga Falls, Ohio, assignor to The Goodyear Tire & Rubber Company, Akron, Ohio, a corporation of Ohio
Filed Oct. 4, 1962, Ser. No. 228,476
2 Claims. (Cl. 301—97)

This invention relates to wheels and rims for mounting inextensible-bead, straight-sidewall type of pneumatic tires, and, more particularly, is concerned with an improved integral fillet joining a tapered bead seat and a side flange of wheels and rims of the stated type.

In the manufacture of wheels for airplanes it is the usual practice to cast these wheels from magnesium, and, less frequently, from aluminum, the wheels being adapted to mount pneumatic tires. If the wheel is designed too heavily the payload of the airplane is reduced, and if the wheel is designed too light it will fail in service. Thus, many engineering problems are present.

Most wheels of the indicated type have tapered bead seats and integral side flanges for retaining the tire beads on the wheel. It has been the usual practice to join the tapered bead seat with the side flange by means of an integral fillet, or bead heel radius, having an outer surface drawn on a radius usually somewhat smaller than the radial thickness of the metal of the bead seat and the axial thickness of the side flange. However, points of stress concentration, wheel cracking and failure still occur between the bead seat and the side flange, and have only been overcome in the past by building up the wall thicknesses of the side flange and the bead seat to required margins of safety of wheel load and roll life, all to the sacrifice of the payload of the airplane.

It is the general object of the present invention to provide an improved metal wheel or rim having a pair of oppositely tapered bead seats and integral side flanges and wherein stress concentration between the bead seats and side flanges are reduced with an attending reduction in the weight of the wheel, but without sacrifice of required margins of safety with respect to wheel load and roll life, or alternatively, to increase the wheel load or roll life without increasing the weight of the wheel.

Another object of the invention is the provision of an improved fillet of elliptical shape between a tapered bead seat and an integral side flange on a cast metal wheel or rim.

Another object of the invention is to increase the roll life, or decrease the weight of a pneumatic tire wheel by decreasing the stress and stress range in the heel radius of the tire bead seat.

The foregoing objects of the invention are achieved by the provision of the combination in a wheel for supporting the inextensible bead of a pneumatic tire of an endless substantially cylindrical bead seat, an integral endless flange extending substantially radially and outwardly from the bead seat, an integral endless fillet filling the corner between the bead seat and the flange, the fillet having a radially outer surface defined by a first long arc tangent to the bead seat and by a second short sharp arc tangent to the first arc and the flange, the radius of the first arc being longer than .312 inch and about four to about eight times longer than the radius of the second arc, the radius of the second arc being substantially smaller than .312 inch, and the pivot point of the first arc being axially spaced from the flange by a distance substantially greater than .312 inch, this distance being between about .6 and about .9 of the radius of the first arc.

For a better understanding of the invention reference should be had to the drawings wherein FIG. 1 is a fragmentary radial sectional view of a typical embodiment of a wheel incorporating the principles of the invention and showing a tire bead mounted on the tapered bead seat.

FIG. 2 is an enlarged fragmentary diagrammatic illustration in cross section of the fillet of FIG. 1.

In the drawings, the numeral 1 indicates generally a cast metal wheel, for example made from magnesium, and having a hub portion 2 and a felly portion 3 terminating in a tapered bead seat 4. The bead seat makes a small angle, for example 5 degrees, with the axis of the wheel. The particular wheel illustrated is made in two halves, the halves being adapted to be joined together by bolts (not shown) extending through holes 5 in the wheel. The tapered bead seat 4 at its larger end is formed with an integral side flange 6, which like the bead seat 4 is endless, and with the flange 6 extending in a radial direction in the manner illustrated and normally formed at its outer periphery with short integral axially-parallel flange 7.

The wheel illustrated is adapted to removably mount a pneumatic tire, with the bead 8 of the tire having an endless inextensible reinforcement 9 and a flexible sidewall 10, all in known fashion. The bead 8 of the tire fits on the tapered bead seat 4 of the wheel 1 with a snug wedging action and the side of the bead 8 engages with the flange 6, all in the manner illustrated in FIG. 1 of the drawings.

Between the tapered bead seat 4 and the radial flange 6 is provided a fillet indicated as a whole by the numeral 11 and having its outer surface in engagement with the heel 12 of the tire bead 8. Having more particular reference to FIG. 2 of the drawings, the fillet 11 has its outer surface defined by a relatively long radius 13 which is tangent to the tapered bead seat 4 and by a radius 14 which is much shorter and which is tangent to the sidewall of the radial flange 6, the radii 13 and 14 being tangent to each other in the manner illustrated.

Stated in another way, the outer surface of the fillet 11 is in the form of an ellipse wherein the longer radius of the ellipse is tangent to the tapered bead seat 4 and the shorter radius of the ellipse is tangent to the side of the flange 6. In a typical but not a limiting embodiment of the invention, the radius 13 is .609 inch and the radius 14 is .109 inch.

In order to better understand the construction of the fillet 11 in FIG. 2 the arc thrown by the longer radius 13 is indicated in FIG. 2 by the chain-dotted construction line 13A, the arc thrown by the smaller radius 14 is indicated by the dotted construction line 14A, the extension of the tapered bead seat 4 to the corner is indicated by the chain-dotted construction line 4A, and the radially inward extension of the radial flange 6 into the corner is indicated by the chain-dotted construction line 6A. Furthermore, in FIG. 2 a radius 15 has been shown defining an arc 15A shown in chain-dotted lines, this arc being tangent to lines 4A and 6A. The radius 15 and the arc defined by it represent the conventional practice for joining the tapered bead seat and the side flange 6. In FIG. 2 the radius 15, in a typical wheel, is .312 inch which is nearly the thickness of side flange 6 and bead seat 4.

It will be recognized from the comparison of the arc 15A (the conventional practice) and the combined arcs 13A and 14A (the present invention) that the present invention provides extra metal along the surface of the bead seat, but with the surface of the fillet then blending on the much smaller radius with the surface of the side flange 6. It has been found that stresses inducing wheel failure are thus reduced by using a larger radius, namely the radius 13 over those portions of the wheel which have been prone to failure and a sharper shorter radius, such as radius 14 where the wheel stresses do not result in failure.

It will be noted that the radius 13 is larger than the conventional fillet radius 15, whereas the radius 14 is smaller than the conventional radius 15, and with the radius 13 being a number of times larger than the radius 14, for example from about four to about eight or more times larger.

Defining the respective radii in another manner, the longer radius 13 is about twice the conventional radius 15, and the shorter radius 14 is about ⅓ the conventional radius 15.

It will also be noted that the pivot point for the longer radius 13 is spaced from the surface of the flange 6 a distance substantially greater than .312 inches a conventional fillet radius. Usually this distance from the pivot point of radius 13 to the surface of the flange 6 is between about .6 and about .9 of the length of the radius 13.

It will be understood that the construction of a wheel in accord with the teaching of the invention will normally require a change in the heel bead radius of the pneumatic tire to be mounted on the wheel so that all portions of the bead of the pneumatic tire engage with the wheel properly.

This application is a continuation-in-part of my copending application Serial No. 56,966, filed September 19, 1960, now abandoned, and bearing the same title.

The invention has been described as employed usually with a cast metal wheel. However, it can also be used with a rolled, forged and/or machined wheel, as will be understood.

While a certain representative embodiment and details have been shown for the purpose of illustrating the invention, it will be apparent to those skilled in this art that various changes and modifications may be made therein without departing from the spirit or scope of the invention.

What is claimed is:

1. The combination in a wheel for supporting the inextensible bead of a pneumatic tire of an endless substantially cylindrical bead seat, an integral endless flange extending substantially radially and outwardly from the bead seat, an integral endless fillet filling the corner between the bead seat and the flange, the fillet having a radially outer surface defined by a first long arc tangent to the bead seat and by a second short sharp arc tangent to the first arc and the flange, the radius of the first arc being longer than .312 inch and about four to about eight times longer than the radius of the second arc, the radius of the second arc being substantially smaller than .312 inch, and the pivot point of the first arc being axially spaced from the flange by a distance substantially greater than .312 inch, this distance being between about .6 and about .9 of the radius of the first arc.

2. The combination in an endless rotary member for supporting the inextensible bead of a pneumatic tire of an endless substantially cylindrical bead seat, the bead seat being tapered inwardly from the flange at an angle of about 5 degrees with the axis of the wheel, an integral endless flange extending substantially radially and outwardly from the bead seat, an integral endless eliptical fillet filling the corner between the bead seat and the flange, the fillet having a radially outer surface defined by a first long arc tangent to the bead seat and by a second short sharp arc tangent to the first arc and the flange, the radius of the first arc being about four to about eight times longer than the radius of the second arc, and the center of the first arc being axially spaced from the flange by a distance between about .6 and about .9 of the radius of the long arc.

No references cited.